Patented Sept. 12, 1939

2,172,369

UNITED STATES PATENT OFFICE 2,172,369

COMPOSITION AND PROCESS OF MAKING POWDER FROM NACREOUS SUBSTANCES

David A. Eolis, Mount Vernon, N. Y., assignor of one-half to Benjamin K. Ury, Brooklyn, N. Y.

No Drawing. Application August 27, 1937, Serial No. 161,296

2 Claims. (Cl. 252—1)

My present invention pertains to an improved process for the treatment of animal shell and nacreous material, and the improved product resulting therefrom.

Animal shells such as oyster and clam shells are composed of many leaf-like layers of shiny microscopic platelets of calcium carbonate imbedded in and bound together by a gluey organic binder. These microscopic platelets vary in size from about 1/50 to 1/3 of a millimeter in length, and are mostly wedge shaped. The surface of an intact and uninjured platelet is highly polished, the platelets being transparent like bits of plate glass. In mass their nacreous properties and luster are due to the absence of a substantial proportion of damaged platelets, and it is upon these properties that their value in the arts is dependent. As found originally in the shell these platelets are nearly all perfect and intact, and of course the proportion of damaged to undamaged platelets will vary in different kinds of shells as well as in shells collected at different times. However, the quality of the platelets in most shells is sufficiently high to render them of value, provided too many are not damaged during the process of obtaining them.

It is accordingly one object of my invention to reduce shells of the above described type to particles of any size desired down to powder or near powder form in such a manner as to preserve the natural luster of the particles.

It is a further object of my invention to produce such nacreous material in such a way as to preserve the fine natural polish of the individual platelets, as well as their natural formation.

It is a further object of my invention to avoid in such a process marring of the polished surfaces of the platelets, as well as to prevent their excessive subdivision.

It is a further object of my invention to produce the novel material described in a process in which all violent and explosive steps are eliminated, i. e., steps involving excessive and/or abrupt application of heat, pressure, or chemical reactions.

It is a further object of my invention to produce a product greatly improved over any obtainable with processes heretofore known.

It is a further object of my invention to provide improved methods for salvaging and utilizing scrap and waste of the shell ends incidental to the machining processes now in use.

Other objects of my present invention will be readily apparent from the following description of my invention, and the claims appended hereto.

The shells to be treated may, if necessary, be first preliminarily cleansed, and broken or crushed into particles of convenient size for further processing. Acid may be used during the cleansing step to dissolve away the outer surface, but must be avoided throughout the remainder of the process, since acid will attack the calcium carbonate of which the platelets are formed and so ruin the polish of their surfaces.

*Preferred embodiment*

In the preferred embodiment of my process I next immerse the shell material in a suitable reagent for softening the organic binder between the platelets to permit their separation by gentle mechanical means without being scratched, broken, or otherwise damaged. Strong reagents as well as vigorous agitation is avoided. The reagent must be such as to attack only the organic binder leaving unaffected the calcium carbonate of which the platelets are composed. As the reagent I prefer to use an aqueous solution of ammonia gas. However, other solutions are also suitable such as those containing a mild alkali, a neutral salt, a non-acid oxidizer, or a combination of these, as for example sodium carbonate, potassium iodide, hydrogen peroxide, ammonium nitrate, sodium hypochlorite, etc.

When use is made of my preferred reagent, i. e., aqueous solution of ammonia gas, the shell material is immersed in the reagent and allowed to remain therein for a period of from three to six weeks, the temperature being maintained in the neighborhood of 25° C. During this immersion the reagent gradually penetrates into and permeates the material under treatment breaking down the organic binder in which the calcium carbonate platelets are embedded, the reagent accomplishing this result by both chemical and solvent action. The first indication of this penetration is the gradual increase of irridescence followed by the development of vivid and variegated coloration which gradually softens to subdued shades such as salmon and mauve as absorbtion of the reagent ensues and the shells soften. The time required to complete the disintegration of the organic binder will vary considerably with the type of raw material used and the size of the original particles. The time required for this step in my process will also vary with the temperature and pressure under which it is conducted.

While 25° C. and atmospheric pressure have proven to give optimum results insofar as the end product is concerned, the time required may be considerably reduced by employing slightly higher temperatures (up to 100° C. without actual boiling may be employed). Actual boiling of the mixture would result in some destructive friction between the component parts of the immersed material and affect the high polish of the individual platelets which is an object of my invention to preserve. It is also important that any change in temperature of the material undergoing treatment be accomplished gradually at least an hour or two being required to raise the temperature to the 100° C. mentioned above.

Similarly pressure somewhat in excess of atmospheric may be employed without too much sacrifice in quality of the produced material, provided any change in pressure is made very gradually so as not to materially agitate or churn the reacting material. The greater the pressure used the greater is the likelihood of damage and of carrying the procedure beyond the optimum end point. My experiments have shown that when the process is conducted properly, pressure up to 300 pounds per square inch may be used, provided this pressure is built up very gradually over a period of from six to eight hours, thus avoiding agitation and churning.

When rapid action is desired I use a combination of an alkali and an oxidizer. A typical example of such a reagent is one containing approximately 10% of monohydrated sodium carbonate and 5% approximately of sodium hypochlorite dissolved in water. With this reagent only 24 hours are required while if the process is conducted at or above the boiling point the time is reduced to about 1 hour. When either of these modifications of this step in my process are employed the finished product is apt to be somewhat less desirable than that obtained by the ammoniacal treatment because of a marked tendency toward over-pulverization. The procedure is, however, rapid and simple and is very effective for some purposes. Also sodium carbonate alone (without the oxidizer) as well as other alkalis produces somewhat similar results but not quite as rapidly, producing a finished product similarly characterized.

After the period of immersion is complete the material is no longer hard and resistant but soft and pulpy, readily falling apart into small particles and readily reduceable to any size desired. In order to thus separate and reduce the size of the particles only the gentlest of means are required. Soft utensil parts are used to prevent damage to the fine polish of the platelets and ovibate excessive pulverization and breakage thereof.

After the softening of the binder and separation of the individual platelets has been thus accomplished, further purification is easily effected since the impurities are now readily accessible. Such purification may be accomplished by soaking and washing with water, alkalis, alcohols, ether, proteolytic enzymes and other solvents. The preferred embodiment of my process as described above is characterized by its simplicity, its inexpensiveness, its fine yield, by the high degree of luster of the finished product and complete freedom from carbonization and discoloration, as well as by the ease of removal of all traces of the reagent and by the ease of recovery of the reagent itself for subsequent and continuous use.

*Alternate process*

Although the end product thereof is not as fine in quality as that of my preferred embodiment described above, my invention may also take the form of the following process:

After the shell material is preliminarily cleansed and crushed as above it may be heated in an oven gradually up to 160–230° C. This heating may be accomplished by placing the material disposed in a comparatively thin layer, in a gently flowing current of superheated steam in an oven modified to suit the purpose, or in a still of the type used in the distillation of oils and glycerin. This heating or baking should continue for 30 to 45 minutes. Placing the material in a current of superheated steam prevents desiccation of the material (the first step in carbonization and discolorization). It also reduces the time required and makes possible processing of very much larger quantities at one time, since the characteristically poor heat conductivity of the raw material is substantially increased by the steam.

The material is next mixed with water and boiled or steamed at 100° C. then strained and washed with boiling water. This boiling or steaming should be conducted for some 30 to 60 minutes depending upon the nature of the material and size of the particles being treated.

The material is next allowed to soak for 12 hours and then the steps of superheating, boiling or steaming, and soaking are repeated. A single baking (as in a current of superheated steam) for two hours, followed by one or two hours of boiling, may be substituted for the two bakings and two boilings specified above, although the latter is preferred.

Again the final step in the process is grading of the material by suspension, etc. and reduction of the particles to the desired sizes in a gentle manner avoiding excessive pulverization and damage to the fine natural polish of the platelets.

The flaky product obtained from the above process may be subjected to further purifying steps as described in connection with my preferred embodiment. While the product obtained by this last process is not of as high a quality as that obtained from my preferred embodiment it is satisfactory for many technical purposes.

The calcium carbonate resulting from the practice of my process may be used for any of the various uses to which this chemical is put in industry and the arts such as in dentifrice, pigments, etc. It may also be employed as a source of material for the production of reconstructed mother of pearl, artificial pearls, and the various articles of commerce manufactured from natural mother of pearl and shell in general, as for example "pearl buttons", for which purposes an artificial binder such as gelatin may be added. A further use for this material is in the combination with a binder for molding into desired shapes as a substitute for the costly machining or natural pearl, and for combination with other plastic materials, dyes and tints for producing novel and beautifying effects.

Other embodiments of my invention, and uses therefor, will be readily apparent to those skilled in the art. I therefore to not wish my invention to be limited to the specific examples and embodiments described above but to include such modifications and changes therein as may be embraced within the appended claims.

What I claim is:

1. A mild process for treating shell materials composed of platelets held together by an organic binder to produce a fine powder consisting of said platelets free from said organic binder, possessing substantially their natural formation, polish, and luster, said process consisting of dissolving away the outer layer of said shell materials with acid, crushing said cleaned shell material to a convenient size, substantially eleminating, after said acid treatment and crushing, all agitation or harsh treatment by immersing the thus treated shell material without further treatment, in an aqueous solution of a mild alkali, gradually increasing the temperature of said solution to between 25° and 100° C., said increase of temperature being gradual enough to eliminate any eddy currents apt to be set up in said solution from said heating, leaving said shell material at said temperature and at atmospheric pressure in said solution with no agitation for a period of at least three weeks until said platelets are freed from said binder, gently washing said platelets with a minimum of agitation in water to free said platelets from any remaining impurities.

2. The process of claim 1 in which the mild alkali is ammonia.

DAVID A. EOLIS.